United States Patent [19]

Leonelli

[11] Patent Number: 5,369,232
[45] Date of Patent: Nov. 29, 1994

[54] DRIVER SIDE AIRBAG MODULE COVER AND HORN SWITCH

[75] Inventor: F. Paul Leonelli, Roy, Utah

[73] Assignee: Morton International, Inc., Chicago, Ill.

[21] Appl. No.: 96,559

[22] Filed: Jul. 23, 1993

[51] Int. Cl.$^5$ .............................................. H01H 9/00
[52] U.S. Cl. .............................. 200/61.54; 280/731
[58] Field of Search ......... 200/5 A, 5 R, 61.54–61.57; 280/728 R, 735

[56] References Cited

U.S. PATENT DOCUMENTS

| | | | |
|---|---|---|---|
| 4,314,114 | 2/1982 | Larson | 200/5 A |
| 4,612,425 | 9/1986 | Kanai et al. | 200/61.55 |
| 4,714,806 | 12/1987 | Inui et al. | 200/61.55 |
| 4,720,610 | 1/1988 | MacHarrie | 200/5 A |
| 4,934,735 | 6/1990 | Embach | 280/731 |
| 5,002,306 | 3/1991 | Hiramitsu et al. | 280/731 |
| 5,062,661 | 11/1991 | Winget | 280/731 |
| 5,085,462 | 2/1992 | Gualtier | 280/731 |
| 5,186,490 | 2/1993 | Adams et al. | 280/731 |
| 5,198,629 | 3/1993 | Hayashi et al. | 200/61.54 |
| 5,265,904 | 11/1993 | Shelton et al. | 280/731 |
| 5,265,905 | 11/1993 | Shelton | 280/731 |
| 5,283,404 | 2/1994 | Prescaro, Jr. et al. | 200/61.54 |

*Primary Examiner*—J. R. Scott
*Attorney, Agent, or Firm*—George W. Rauchfuss; Gerald K. White

[57] ABSTRACT

An airbag cover is provided with a membrane horn switch which is more reliable than prior art switches. A portion of the cover is thinned to provide a flexible horn actuation area. The membrane switch is mounted against the inner surface of the horn actuation area and is backed by a rigid panel mounted to the cover.

4 Claims, 2 Drawing Sheets

FIG. 1
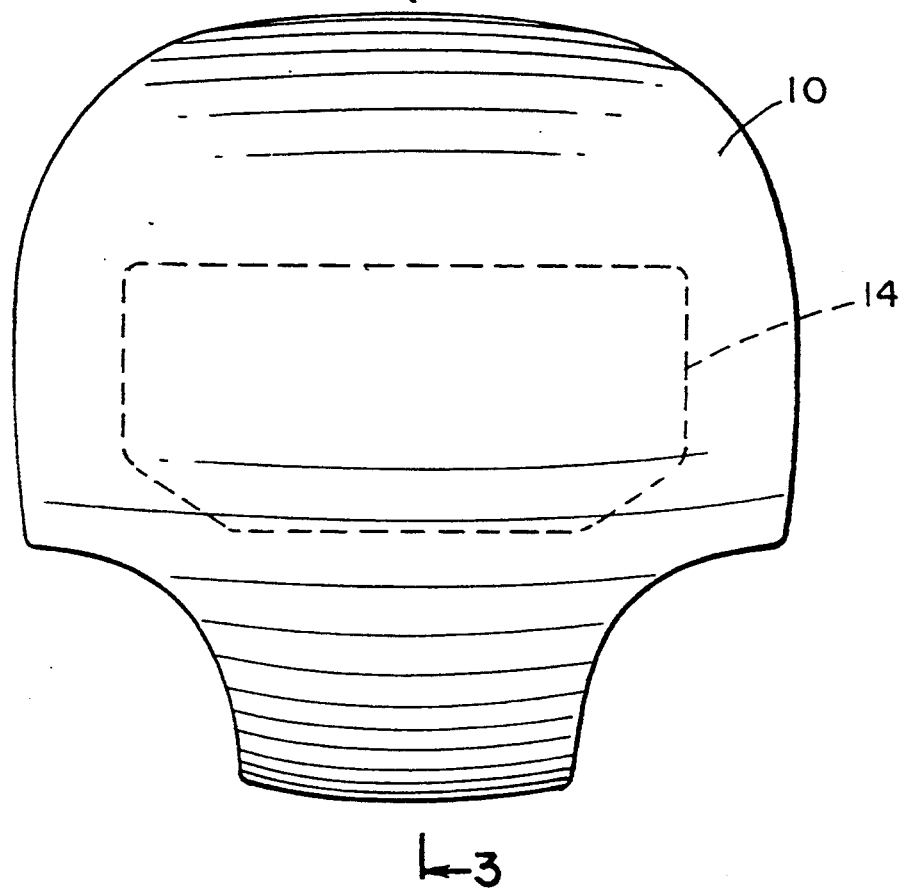
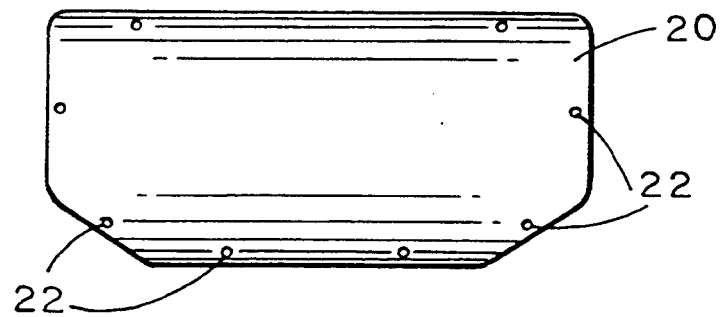
FIG. 2

DRIVER SIDE AIRBAG MODULE COVER AND HORN SWITCH

TECHNICAL FIELD

This invention relates to motor vehicle airbags. More particularly, it relates to a driver side airbag having an integral horn switch-which is easily and reliably actuated.

BACKGROUND ART

Typically a driver side airbag module is mounted within a motor vehicle's steering wheel. This is the same area which conventionally includes the horn switch. Accordingly, the resilient thermoplastic airbag module cover has also served to actuate a horn switch. One way in which this has been accomplished has been to mount a membrane type switch on the back or inner surface of the airbag module cover. Membrane type switches conventionally comprise two very thin sheets having conductive coatings which are normally separated by thin spacers. Pressure on the switch presses the conductive surfaces together to close a circuit and actuate the horn. The thickness of such a switch may be only, for example, approximately 0.25 mm thick.

Obviously in order to actuate a membrane switch, the force applied by the driver must be able to compress the switch. In prior art installations, the membrane switch could only be compressed against the folded airbag itself. As a result, a fairly substantial degree of cover depression was required. The result was less than optimum reliability and slowed reaction in emergency situations.

Accordingly, it a primary object of the present invention to provide an improved airbag cover and horn switch assembly having increased reliability and emergency actuation response. Other objects, features, and advantages will become apparent from the following description and appended claims.

DISCLOSURE OF INVENTION

A driver side airbag module cover includes a relatively flexible horn actuation area which is depressible from its front surface by a driver. A membrane type horn switch is mounted on the rear surface of the cover and behind the horn actuation area. A substantially rigid back panel is mounted to the rear surface of the airbag module cover enclosing the horn switch therebetween.

BRIEF DESCRIPTION OF THE DRAWINGS

FIG. 1 is the driver's view of an airbag cover in accordance with this invention;

FIG. 2 is an elevational view of a back panel employed in the invention;

BEST MODE FOR CARRYING OUT THE INVENTION

Figure 3:
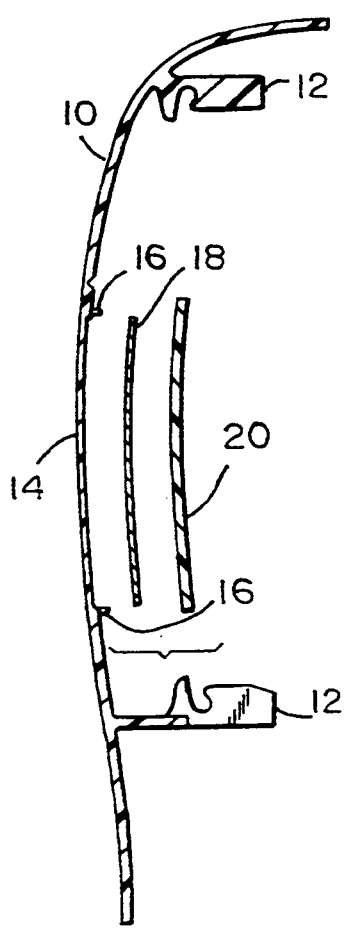
FIG. 3 is a cross-section taken substantially along the line 3—3 of FIG. 1 showing the elements of the invention in exploded format.
Figure 4:
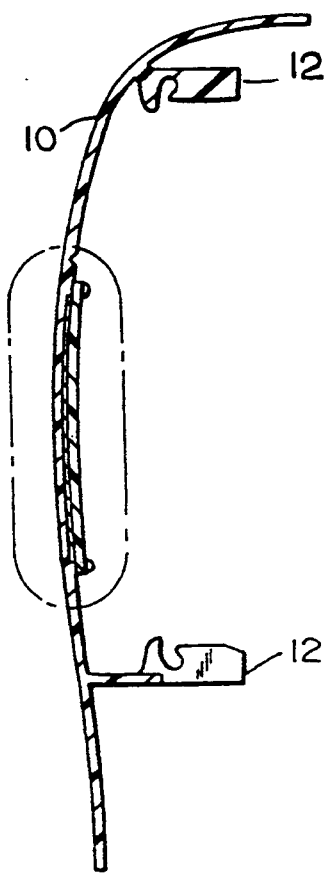
FIG. 4 is a view similar to FIG. 3 showing the elements assembled.

FIG. 1 illustrates a thermoplastic cover 10 for a driver side airbag module. The view of the cover is that of the driver and the cover would be positioned within the automotive steering wheel. The normal thickness of the front wall of the cover 10 is on the order of 2.5–3.0 mm. The rear surface of the cover 10 is provided with conventional mounting lugs 12 (FIG. 3).

In accordance with the present invention, a portion of the cover 10 is reduced in thickness to approximately 1.0–2.0 mm to provide a horn actuation area 14. The thinning of this area increases its flexibility. In the illustrated embodiment the horn actuation area 14 is surrounded by thermoplastic posts 16 which extend rearwardly from the inner surface of the cover 10. The dimensions of the horn actuation area 14 are such as to receive therein a membrane type horn switch 18 which substantially fills the horn actuation area 14.

Figure 5:
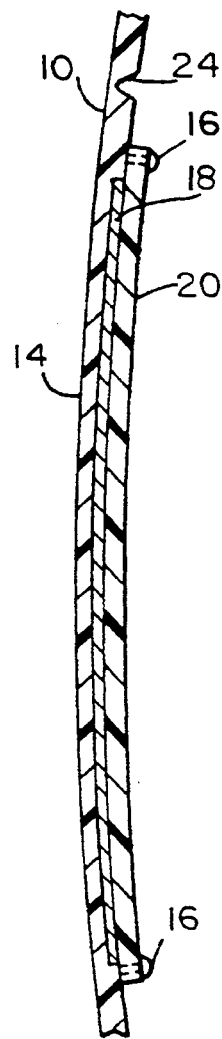
FIG. 5 is an enlarged cross-sectional detail of the horn actuation area of the invention.

A relatively rigid back panel 20 is molded to fit the contour of the inner surface of the cover 10 and is dimensioned to slightly overlap the horn actuation area 14. It is provided with mounting holes 22 which are arranged to receive the posts 16. The back panel 20 may be, for example, polypropylene or filled polypropylene. In one embodiment, it has a thickness of 1.5–2.5 mm. It is mounted by means of the holes 22 onto the posts 16 which are then heat staked as illustrated in FIG. 5 to firmly support the horn switch 18 between the back panel 20 and the horn actuation area 14. In the illustrated embodiment, it will be seen from FIG. 5 that the horn actuation assembly is mounted just below one of the airbag tear seams 24 in the cover 10.

Referring now to FIG. 5, it will be clearly seen that the membrane type horn switch 20 is sandwiched between a thin and flexible horn actuation area 14 and a relatively rigid back panel 20. It will also be seen that the back panel 20 overlaps the horn actuation area 14 to provide a stable and rigid pressure surface. Depression of the horn actuation area 14 by the driver will readily compress the horn switch 18 against the back panel 20 without relying on any contact or force applied against the airbag enclosed by the cover. The back panel 20 has been described as secured to the cover 10 by means of heat staking. However, other means of assembly may also be utilized such as thermal bonding or cementing.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. A relatively flexible driver's side airbag module cover having a front outer surface and a rear inner surface which comprises:

a horn actuation area defined by a thinned area on the rear inner surface of said cover and depressible from its front surface by a driver;

a membrane type horn switch mounted behind said horn actuation area within and substantially filling said thinned area on the rear surface of said cover; and a substantially rigid back panel mounted to the rear surface of said cover, overlapping said thinned area and enclosing said horn switch therebetween.

2. The cover of claim 1 wherein said cover is a thermoplastic.

3. The cover of claim 2 wherein said back panel is mounted to said cover by heating said cover.

4. The cover of claim 3 wherein said back panel is heat staked to said cover.

* * * * *